(12) United States Patent
Liu et al.

(10) Patent No.: US 11,808,904 B2
(45) Date of Patent: Nov. 7, 2023

(54) EXPERIMENTAL SYSTEM FOR OUT-OF-PLANE SEISMIC PERFORMANCE OF MASONRY BLOCK WALL, AND EXPERIMENTAL METHOD USING SAME

(71) Applicant: NANJING GONGDA CONSTRUCTION TECHNOLOGY CO., LTD., Nanjing (CN)

(72) Inventors: Yanqin Liu, Nanjing (CN); Zhanggen Guo, Nanjing (CN); Yuqiang Xiong, Nanjing (CN); Haipeng Xu, Nanjing (CN); Fang Yang, Nanjing (CN)

(73) Assignee: NANJING GONGDA CONSTRUCTION TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 18/030,994

(22) PCT Filed: Apr. 19, 2021

(86) PCT No.: PCT/CN2021/088155
§ 371 (c)(1),
(2) Date: Apr. 8, 2023

(87) PCT Pub. No.: WO2022/183577
PCT Pub. Date: Sep. 9, 2022

(65) Prior Publication Data
US 2023/0288591 A1    Sep. 14, 2023

(30) Foreign Application Priority Data

Mar. 3, 2021   (CN) .......................... 202110235980.3

(51) Int. Cl.
*G01V 1/30*      (2006.01)
*E04B 2/30*      (2006.01)
(Continued)

(52) U.S. Cl.
CPC .............. *G01V 1/30* (2013.01); *E04B 1/4178* (2013.01); *E04B 2/30* (2013.01); *E04B 2/38* (2013.01);
(Continued)

(58) Field of Classification Search
USPC .......................................................... 702/14
See application file for complete search history.

(56) References Cited

U.S. PATENT DOCUMENTS

2015/0338549 A1* 11/2015 Li ........................ G01V 99/005
                                                            703/6
2020/0095762 A1*  3/2020 Zhang ..................... E04C 2/044

FOREIGN PATENT DOCUMENTS

CN     206038456      3/2017
CN     107228803      10/2017
(Continued)

*Primary Examiner* — Paul D Lee
(74) *Attorney, Agent, or Firm* — Treasure IP Group, LLC

(57) ABSTRACT

An experimental system for out-of-plane seismic performance of a masonry block wall, comprising: a static test bed (1), a lateral limiting system disposed on one side on the static test bed (1), and a transverse load system disposed on the other side on the static test bed (1), a masonry block wall to be tested (401) being disposed between the lateral limiting system and the transverse load system. The experimental system also comprises a vertical load system disposed above a wall. Also provided is an experimental method using the experimental system for out-of-plane seismic performance of a masonry block wall, on the basis of a quasi-static test method, a horizontal reciprocating actuator is used to simulate an out-of-plane seismic load action; quarter-point loading is implemented by means of a multi-stage shear stress distribution apparatus, then a force is transmitted to a second screw rod (602), and the second screw rod (602) fits an out-of-plane uniformly distributed load into four horizontally-equidistant transversely-concentrated forces and trans- (Continued)

mits same to a test piece. The present invention has the characteristics of a clear force transmission path, uniform stress distribution, high experimental precision and an accurate result, such that the study of the out-of-plane seismic performance of a component is more accurate and reliable.

8 Claims, 2 Drawing Sheets

(51) Int. Cl.
    *E04B 1/41*     (2006.01)
    *G01V 1/22*     (2006.01)
    *G01V 1/04*     (2006.01)
    *E04B 2/38*     (2006.01)
    *G01V 1/50*     (2006.01)

(52) U.S. Cl.
    CPC ................. *G01V 1/04* (2013.01); *G01V 1/22* (2013.01); *G01V 1/50* (2013.01)

(56) References Cited

FOREIGN PATENT DOCUMENTS

| | | |
|---|---|---|
| CN | 108918071 | 11/2018 |
| CN | 111257136 | 6/2020 |
| JP | 2008241247 | 10/2008 |

* cited by examiner

EXPERIMENTAL SYSTEM FOR OUT-OF-PLANE SEISMIC PERFORMANCE OF MASONRY BLOCK WALL, AND EXPERIMENTAL METHOD USING SAME

CROSS-REFERENCE TO RELATED APPLICATION

The present disclosure is a Section 371 National Stage application of International Application No. PCT/CN2021/088155, which is filed on Apr. 19, 2021 and published as WO/2022/183577 on Sep. 9, 2022, and claims priority to a Chinese Patent Application No. 202110235980.3, entitled "EXPERIMENTAL SYSTEM FOR OUT-OF-PLANT: SEISMIC PERFORMANCE OF MASONRY BLOCK WALL, AND EXPERIMENTAL METHOD USING SAME", filed on Mar. 3, 2021, the entire contents of which is incorporated herein by reference in their entireties.

TECHNICAL FIELD

The present invention relates to the field of seismic testing technology for building structures, and in particular, to a seismic performance testing system and method for the out-of-plane seismic performance of masonry walls.

BACKGROUND

Masonry structure is the oldest form of building structure in the world. Because masonry materials are widely available, easy to construct, and relatively inexpensive, they have been widely used in countries around the world. However, due to the brittle nature of brick masonry, it has a certain compressive bearing capacity but very low tensile, shear, and bending resistance. Therefore, the overall integrity and load-bearing capacity of masonry structures, especially unreinforced masonry structures, are poor. Since the tensile strength of masonry blocks and mortar is very low, masonry walls quickly bend and fail along the mortar joints when subjected to out-of-plane loads. While the longitudinal steel bars in reinforced masonry walls are mainly arranged closely to each other, outside the plane, near the neutral axis where the section is bent, thus their contribution to resist out-of-plane bending moments is very limited. The current regulations provide very detailed instructions for the analysis of in-plane stress distribution in masonry structures, yet in practice, only the in-plane stress performance of masonry is generally considered, as the out-of-plane stress performance is only considered in the structure. However, masonry structures may also be subjected to out-of-plane loads caused by strong winds, floods, blast waves, landslides, etc. during in-plane loading. The design of experimental testing methods and experimental testing equipment plays a crucial role in simulating the actual stress conditions of walls under load. Existing quasi-static test equipment, especially bending test equipment, has significant limitations, such as the inability to eliminate the weight of test pieces and the ability to perform only monotonic loading. Therefore, a new experimental testing system and method for the out-of-plane seismic performance of masonry walls is designed to improve the experimental research on the seismic performance of masonry walls and provide theoretical references for the design and reinforcement of masonry walls.

SUMMARY OF THE INVENTION

The invention aims to provide an experimental testing system and method for the out-of-plane seismic performance of masonry walls, which can more realistically simulate the force and seismic performance of the wall under earthquake loads, and the experimental test results should be reliable and in line with expectations.

To achieve the above objectives, the present invention is implemented through the following technical solutions.

The present invention provides a testing system for the out-of-plane seismic performance of masonry walls, comprising: a static pedestal, a transverse limiting system located on one side of the static pedestal, a lateral load system located on the other side of the static pedestal, and a test masonry wall located between the transverse limiting system and the lateral load system. The test masonry wall is fixed to the static pedestal by a foundation beam, and a circular beam is poured above the test masonry wall. The testing system further comprises a vertical load system located above the circular beam.

The transverse limiting system comprises at least one tripod stand located on one side of the test masonry wall. A bottom surface of the tripod stand is fixed on the static pedestal, and the upper end of the side of the tripod stand facing the masonry wall is provided with multiple first screw rods between the tripod stand and the circular beam. The lower end of the side of the tripod stand facing the foundation beam is fixedly connected to the foundation beam. The oblique side of the tripod stand is also provided with a pad, which is fixed on the static pedestal. A horizontal jack is provided between the pad and the oblique side of the tripod stand.

The lateral load system comprises a reaction wall fixed on the static pedestal and located on the other side of the test masonry wall. A horizontal reciprocating actuator is provided between the reaction wall and the test masonry wall, and the base of the horizontal reciprocating actuator is fixed on the wall of the reaction wall. A multi-stage shear force distribution device is also provided between the horizontal reciprocating actuator and the test masonry wall. The multi-stage shear force distribution device comprises a vertically installed long H-shaped steel member and two short H-shaped steel members. One side of the long H-shaped steel member is connected to the end of the horizontal reciprocating actuator, and the other side of the long H-shaped steel member has two short H-shaped steel members symmetrically arranged at the upper and lower ends. The long H-shaped steel member is fixedly connected to the short H-shaped steel members through steel pipes, and the two short H-shaped steel members are connected to the double-sided screw rod connection device fixed on the test masonry wall.

The vertical load system comprises at least one reaction frame, which comprises a horizontal beam fixed to the static pedestal through columns and located above the circular beam. A compression beam is connected below the horizontal beam, which is parallel to and located directly above the circular beam. Multiple vertical jacks are provided between the compression beam and the circular beam.

Furthermore, both ends of the two short H-shaped steel members are connected to the double-sided screw rod connection device, which comprises steel rings symmetrically positioned at the ends of the test masonry wall, along the centerline of the wall, and a second screw rod fixed horizontally to the wall surface. The second screw rod is located on both sides of the masonry wall, and the upper and lower limbs of the steel rings are embedded in the mortar joints of the masonry wall.

The short H-shaped steel member is connected to the second screw rod on the adjacent side.

Additionally, there are two vertical jacks located symmetrically at the one-third points of the circular beams between the compression beam and the circular beam.

The steel pipe is horizontally positioned at the center position of the short H-shaped steel member and is fixedly connected to both the short and long H-shaped steel members by welding.

Further, the transverse limiting system comprises two tripods, two first screw rods are arranged in parallel between the two tripods and the circular beam. The two tripods are symmetrically located along the centerline of the test masonry wall.

The vertical load system comprises two reaction frames, which are symmetrically located along the centerline of the test masonry wall.

Additionally, the lateral load system comprises a hoisting device, one end of which is fixed to the horizontal beam, and the other end of which is connected to both the long H-shaped steel member and the short H-shaped steel member, wherein the one short H-shaped steel member is connected to the upper end of the long H-shaped steel member.

Wherein both the lateral and vertical jacks are electrically controlled hydraulic jacks; a diameter of the first screw rod is larger than that of the second screw rod.

The present invention also provides an experimental method for testing the out-of-plane seismic performance of test masonry walls, comprising the following steps:

Step S1: Place the test masonry wall on the foundation beam of the static platform, and set the transverse limiting system on one side of the test masonry wall. The transverse limiting system is fixed on the static platform and provides lateral support for the test masonry wall. Then, set the vertical load system at the top of the test masonry wall.

Step S2: Set the lateral load system on the other side of the test masonry wall. During the setting of the lateral load system, hoisting the multi-level shear force distribution device to the predetermined position using the hoisting device, and then connect the multi-level shear force distribution device with the horizontal reciprocating actuator and the double-sided screw rod connection device.

Step S3, apply axial pressure to the test masonry wall using the vertical load system.

Step S4, based on the pseudo-static test method, simulate out-of-plane seismic loads using the horizontal reciprocating actuator to apply lateral loads to the test masonry wall. While loading the test masonry wall, measure and record the lateral displacement and corresponding lateral load.

Step S5, obtain the load-displacement hysteresis curve based on the lateral displacement and corresponding lateral load.

The present invention provides a masonry wall out-of-plane seismic performance testing system, which comprises:

The present invention also provides a testing method for applying the masonry wall out-of-plane seismic performance testing system, including the following steps:

The advantageous effects of the present invention are:
1. The present invention uses a multi-level shear force distribution device to transfer the force from the four-point loading to the second screw rod, which then distributes the out-of-plane uniform load into four horizontal concentrated forces of equal distance and transmits them to the test masonry wall. This has the characteristics of clear force transmission paths, uniform stress distribution, high experimental accuracy, and precise results, making the study of the out-of-plane seismic performance of components more accurate and reliable.
2. Compared with traditional bending load tests, the present invention sets up a double-sided screw rod connection device on the wall and connects it to the multi-level shear force distribution device, enabling the test masonry wall to be subjected to forces in both the push and pull directions, which better simulates the actual working performance of the wall under seismic loads rather than simple monotonic loading.
3. Through multiple experiments using the testing system disclosed herein, specifically through four sets of masonry wall out-of-plane seismic performance tests, different experimental parameters such as load-displacement relationship, hysteresis curve skeleton curve, etc. were obtained. The experimental results showed that the application of the testing system provided by the present invention was safe, controllable, reliable, stable, and accurate.

In the figures:
1—Static base,
201—Tripod,
202—First screw rod,
203—Pad,
204—Horizontal jack,
301—Reaction wall,
302—Horizontal reciprocating actuator,
3031—Long H-shaped steel member,
3032—Short H-shaped steel member
3033—Steel pipe,
401—Test masonry wall,
402—Foundation beam,
403—Circular beam,
501—Horizontal beam,
502—Column,
503—Compression beam,
504—Vertical jack,
601—Reinforcing steel ring,
602—Second screw rod,
7—Hoisting device

DETAILED DESCRIPTION

In order to make the objectives, technical solutions, and advantages of the embodiments of the present invention clearer, the technical solutions of the embodiments of the present invention will be described clearly and completely with reference to the drawings in the embodiments of the present invention. Obviously, the described embodiments are only a part of the embodiments of the present invention, rather than all embodiments. Based on the embodiments of the present invention, all other embodiments obtained by ordinary skilled artisans in the art without creative labor are within the scope of protection of the present invention.

Example 1

Figure 1:
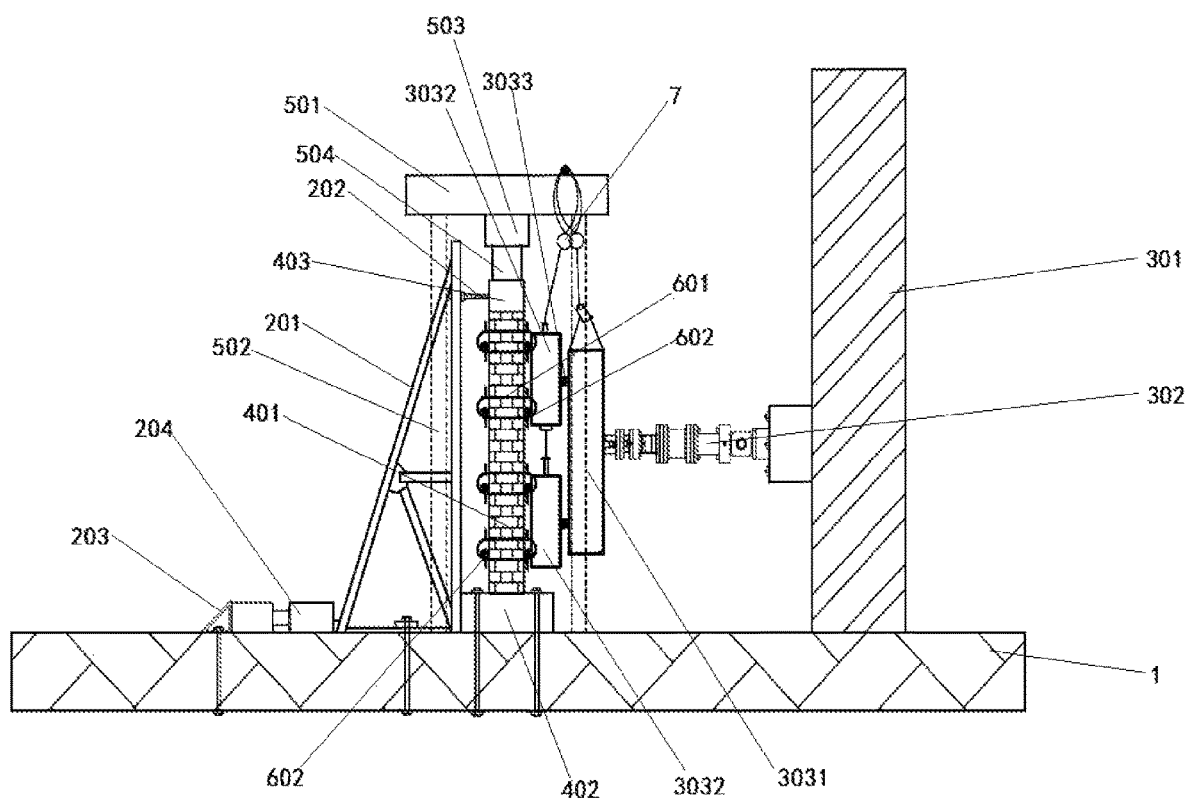
FIG. 1 is a schematic diagram of the structure of the testing system provided in Example 1.
Figure 2:
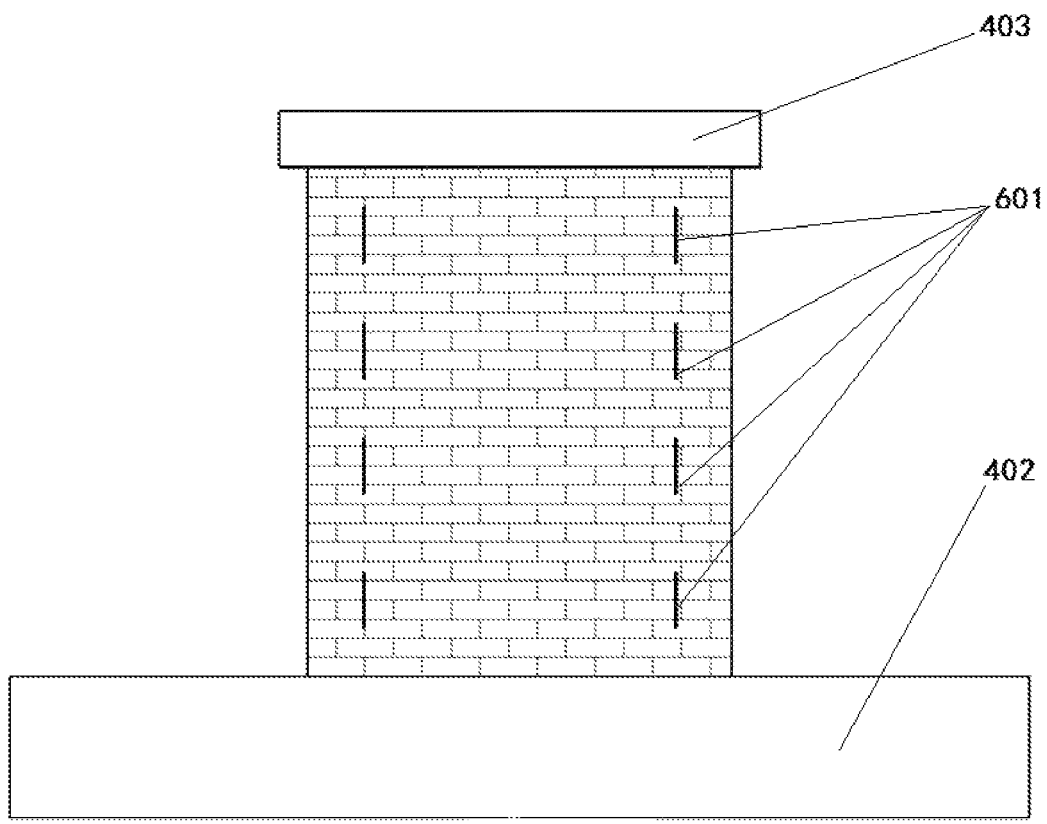
FIG. 2 is a schematic diagram of the test masonry wall in Example 1.

Referring to FIGS. 1 and 2, this embodiment provides a seismic performance testing system for a test masonry wall.

The system comprises a static base 1, a transverse limiting system set on one side of the static base 1, a lateral load system set on the other side of the static base 1, and the masonry wall 401 to be tested, which is located between the transverse limiting system and the lateral load system. The masonry wall 401 is fixed to the static base 1 via a foundation beam 402, and a circular beam 403 is poured on top of the masonry wall 401. The experimental system also comprises a vertical load system set above the circular beam 403.

Specifically, in this embodiment, the transverse limiting system comprises two tripods 201, both of which are located on one side of the masonry wall 401 to be tested. The bottom surfaces of these two tripods 201 are fixed to the static base 1. Two first screw rods 202, which are coarse screw rods, are parallelly set between the upper ends of one side of the two tripods 201 and the circular beam 403. The two tripods 201 are symmetrically arranged along the centerline of the test masonry wall 401. The purpose of setting the two coarse screw rods is to press against the circular beam 403 to form a boundary condition and prevent the test masonry wall from sliding during the loading process.

The lower ends of one side of these two tripods 201 are fixedly connected to the foundation beam 402. The inclined side of the two tripods 201 is also provided with a pad 203, which is fixed to the static base 1. Between the pad 203 and the inclined side of the tripod 201, there is a transverse jack 204, which is an electrically controlled hydraulic jack.

Specifically, in this embodiment, the lateral load system comprises a reaction wall 301, which is fixed to the static base 1 and located on the other side of the masonry wall 401 to be tested. A horizontal reciprocating actuator 302 is set between the reaction wall 301 and the masonry wall 401 to be tested. The base of the horizontal reciprocating actuator 302 is fixed to the wall surface of the reaction wall 301. A multi-stage shear force distribution device is also set between the horizontal reciprocating actuator 302 and the masonry wall 401 to be tested. The multi-stage shear force distribution device comprises a vertically set long H-shaped steel member 3031 and two short H-shaped steel members 3032. One side of the long H-shaped steel member 3031 is connected to the end of the horizontal reciprocating actuator 302. The upper and lower ends of the other side of the long H-shaped steel member 3031 are symmetrically set with two short H-shaped steel members 3032, for a total of two short H-shaped steel members 3032. The long H-shaped steel member 3031 and the two short H-shaped steel members 3032 are fixedly connected by a steel pipe 3033, which is horizontally set and located at the midpoint of the short H-shaped steel members 3032. The steel pipe 3033 is welded to the short H-shaped steel members 3032 and the long H-shaped steel member 3031. The two short H-shaped steel members 3032 are connected to the double-sided screw rod connection device fixed on the masonry wall 401 to be tested.

The long H-shaped steel member 3031 and two steel pipes 3033 are used as primary distribution beams, and the short H-shaped steel member 3032 is used as a secondary distribution beam. The long H-shaped steel member 3031 is connected to the two short H-shaped steel members 3032 to form a multi-level shear force distribution system.

Specifically, the lateral load system also comprises a hoisting device 7. One end of the hoisting device 7 is fixed to the horizontal beam 501, and the other end of the hoisting device 7 is respectively connected to the long H-shaped steel member 3031 and the short H-shaped steel member 3032 connected to the upper end of the long H-shaped steel member 3031.

Specifically, in this embodiment, both the upper and lower ends of the two short H-shaped steel member 3032 are connected with double-sided screw rod connection devices. The double-sided screw rod connection device comprises a steel ring 601 symmetrically arranged along the centerline of the tested masonry wall 401 at both ends of the tested masonry wall 401, and a second screw rod 602 horizontally fixed on the wall surface. The second screw rod 602 is a thin screw rod and is provided on both sides of the tested masonry wall 401. The upper and lower limbs of the steel ring 601 are embedded in the mortar joint of the tested masonry wall 401. The advantage of this design is that the strength of the wall will not be reduced by pre-embedding in the mortar joint. The short H-shaped steel member 3032 is connected to the adjacent second screw rod 602 on one side.

Specifically, in this embodiment, the vertical load system comprises two reaction frames, and each reaction frame comprises a horizontal beam 501. The horizontal beam 501 is fixed to the static base 1 through the column 502 and is located above the circular beam 403. A compression beam 503 is connected below the horizontal beam 501. The compression beam 503 is level with the circular beam 403 and located directly above the circular beam 403. Two vertical jacks 504 are provided between the compression beam 503 and the circular beam 403. The vertical jacks 504 are electrically controlled hydraulic jacks and are symmetrically placed at the one-third points of the circular beam 403.

Specifically, in this embodiment, the two ends of the foundation beam 402, the bottom surface of the tripod 201, and the bottom surface of the pad 203 are all fixed to the static base 1 through ground bolts, and the base of the horizontal reciprocating actuator 302 is fixed to the reaction wall 301 through bolts.

The purpose of setting up a vertical load system in the experimental system provided in this embodiment is to allow the vertical jack 504 to apply vertical loads to the wall, so that the wall can bear vertical loads that are closer to the real situation. When using this experimental system for experiments, the vertical jack 504 can be pressurized first to adjust the load value to a fixed value that can simulate the vertical load of the upper structure. Then, the horizontal reciprocating actuator 302 is opened to simulate the effect of horizontal out-of-plane seismic loads using pseudo-static testing methods, so as to obtain the ideal experimental results and load-displacement hysteretic curves under more realistic wall loading conditions.

In this embodiment, by using a multi-level shear force distribution device and embedding steel reinforcement rings 601 in the mortar joint on both sides of the wall and precisely fitting the second screw rod 602 into them to be in close contact with the wall surface, the horizontal reciprocating actuator 302 can apply horizontal out-of-plane low-frequency cyclic loads to the wall under the action of the vertical jack 504.

In this embodiment, the loading end is realized by distributing the load through the distribution beam to the four-point loading and then transmitting the force to the second screw rod 602. The second screw rod 602 converts the uniformly distributed out-of-plane load into four horizontal concentrated forces that are evenly spaced and transmitted to the specimen, with clear force transmission paths, uniform stress distribution, high experimental accuracy, and precise results. This makes the research on the out-of-plane seismic performance of walls more accurate and reliable.

This embodiment uses a double-sided screw rod connection device to enable the wall to be subjected to forces in both the pushing and pulling directions. By placing two short screw rods parallel to the wall circular beam 403 on the tripod 201 to form boundary conditions, the masonry wall can prevent slipping during the loading process and ensure that it can fully exert its bearing and deformation capacity.

Example 2

This example provides an experimental method for testing the seismic performance of masonry walls on the exterior of a building, including the following steps:

Step S1: Place the test masonry wall on the foundation beam of a static platform and set up a transverse limiting system on one side of the test masonry wall. The transverse limiting system is fixed to the static platform and provides lateral support for the test masonry wall. Then, set up a vertical load system at the top of the test masonry wall.

Specifically, to set up the transverse limiting system, two tripods are set up on one side of the test masonry wall symmetrically along the axis of the wall. Then, a horizontal jack and a cushion plate are successively set up for each tripod, and two parallel coarse threaded rods are set between the tripods and the circular beam of the test masonry wall to form the boundary conditions of the test masonry wall, to prevent the wall from sliding during the loading process.

To set up the vertical load system, a reaction frame is symmetrically set up above both ends of the test masonry wall. Below the reaction frame, a compression beam and two vertical jacks are successively set up, and the vertical jacks are symmetrically placed at the one-third point of the circular beam.

Step S2: Set up a horizontal load system on the other side of the test masonry wall, specifically, set up a reaction wall on the other side of the test masonry wall. Between the reaction wall and the test masonry wall, set up a horizontal reciprocating actuator and a multi-stage shear force distribution device. Then connect the multi-level shear distribution device to the double-sided screw connection device and the horizontal reciprocating actuator previously installed on the wall.

During the setup of the horizontal load system, the multi-level shear distribution device can be lifted to the predetermined position by a hoisting device, and then connected to the horizontal reciprocating actuator and the double-sided screw connection device.

Step S3: Use the vertical load system to apply axial pressure to the tested masonry wall. The load value needs to be adjusted to a fixed value that can simulate the vertical load of the upper structure.

Step S4: Based on the pseudo-static test method, use the horizontal reciprocating actuator to simulate the lateral seismic load on the tested masonry wall. After the load is transmitted through the multi-level shear distribution device, it acts on the center axis position of the wall. While loading the load, measure and record the lateral displacement and corresponding lateral load of the tested masonry wall. The lateral displacement is directly measured by the displacement sensor.

Step S5: Obtain the load-displacement hysteresis curve based on the lateral displacement and corresponding lateral load.

Any details not described in the present invention are common knowledge to those skilled in the art.

The above detailed description provides the best specific embodiments of the present invention. It should be understood that those skilled in the art can make many modifications and changes to the present invention without creative labor based on the concept of the present invention. Therefore, all technical solutions that those skilled in the art can obtain based on logical analysis, inference, or limited experiments on the basis of the concept of the present invention in the prior art are within the scope of protection defined by the claims.

The invention claimed is:

1. A seismic performance testing system for a masonry wall plane, comprising:
a static base,
a transverse limiting system set on one side of the static base,
a lateral load system set on an other side of the static base, and
a test masonry wall set between the transverse limiting system and the lateral load system;
wherein
the test masonry wall is fixed to the static base by a foundation beam, and a circular beam is poured above the test masonry wall;
the testing system further comprises a vertical load system set above the circular beam;
the transverse limiting system comprises at least one tripod set on one side of the test masonry wall;
a base of the tripod is fixed to the static base, and multiple first screws are set between an upper end of a tripod plane and the circular beam;
a lower end of the tripod plane is fixedly connected to the foundation beam;
an oblique side of the tripod is also equipped with a pad, which is fixed on the static base;
a horizontal jack is set between the pad and the oblique side of the tripod;
the lateral load system comprises a reaction wall fixed to the static base and set on the other side of the test masonry wall;
a horizontal reciprocating actuator is set between the reaction wall and the test masonry wall, and a multi-level shear distribution device is set between the horizontal reciprocating actuator and the test masonry wall;
the multi-level shear distribution device comprises a long H-shaped steel member and two short H-shaped steel members; one side of the long H-shaped steel member is movably connected to the end of the horizontal reciprocating actuator, and an other side of the long H-shaped steel member is symmetrically set with short H-shaped steel members at the upper and lower ends; the long H-shaped steel member and the short H-shaped steel members are fixedly connected by a steel pipe; the two short H-shaped steel members are connected to a double-sided screw connection device fixed on the test masonry wall;
the vertical load system comprises at least one reaction frame, which comprises a horizontal beam fixed to the static base by a column and placed above the circular beam; a compression beam is connected below the horizontal beam, which is flush with the circular beam and placed directly above it; and multiple vertical jacks are set between the compression beam and the circular beam.

2. The seismic performance testing system for the masonry wall plane, according to claim 1, characterized in that both upper and lower ends of the two short H-shaped steel members are connected with a double-sided screw connection device, and the double-sided screw connection device comprises: reinforcing steel member rings symmetrically arranged along a center line of the test masonry wall at both ends of the test masonry wall, and a second screw fixed horizontally on the wall surface, wherein the second screw is provided on both sides of the test masonry wall, and upper and lower limbs of the reinforcing steel member rings are embedded in the mortar joints of the test masonry wall; and the short H-shaped steel members are connected to the second screw on an adjacent side.

3. The seismic performance testing system for the masonry wall plane, according to claim 2, characterized in that two vertical jacks are provided between the compression beam and the circular beam, and the vertical jacks are symmetrically placed at a third equal division point of the circular beam.

4. The seismic performance testing system for the masonry wall plane, according to claim 3, characterized in that the steel pipes are horizontally positioned at the center line position of the short H-shaped steel member, and the steel pipes are fixedly connected to the short H-shaped steel member and the long H-shaped steel member by welding.

5. The seismic performance testing system for the masonry wall plane, according to claim 4, characterized in that the transverse limiting system comprises two tripods, and two first screws are parallelly arranged between the two tripods and the circular beam, and the two tripods are symmetrically arranged along the center line of the test masonry wall; and the vertical load system comprises two reaction frames symmetrically arranged along the center line of the test masonry wall.

6. The seismic performance testing system for the masonry wall plane according to claim 5, characterized in that the lateral load system further comprises a hoisting device, wherein one end of the hoisting device is fixed on the horizontal beam, and the other end of the hoisting device is respectively connected to the long H-shaped steel member and the short H-shaped steel member connected to the upper end of the long H-shaped steel member.

7. The seismic performance testing system for the masonry wall plane according to claim 6, characterized in that the lateral jack and the vertical jack are electrically controlled hydraulic jacks; and the diameter of the first screw is greater than the diameter of the second screw.

8. A testing method for the seismic performance of a masonry wall plane, comprising using the seismic performance testing system as claimed in claim 1, and performing the following steps:
   Step S1: placing the test masonry wall on the foundation beam of the static base, setting a transverse limiting system on one side of the masonry wall, fixing the transverse limiting system on the static base, and providing lateral support for the test masonry wall; and setting a vertical load system at the upper end of the test masonry wall;
   Step S2: setting a lateral load system on the other side of the test masonry wall; while setting the lateral load system, hoisting the multi-level shear force distribution device to the preset position using the hoisting device, and then connecting the multi-level shear force distribution device with the horizontal reciprocating actuator and the double-sided screw connection device;
   Step S3: applying axial pressure to the test masonry wall using the vertical load system;
   Step S4: based on a quasi-static test method, simulating the out-of-plane seismic load using the horizontal reciprocating actuator to apply lateral load to the test masonry wall; during the loading process, measuring and recording the lateral displacement and corresponding lateral load of the test masonry wall; and
   Step S5: obtaining the load-displacement hysteresis curve based on the lateral displacement and corresponding lateral load.

\* \* \* \* \*